United States Patent
Singh et al.

(10) Patent No.: US 11,467,738 B2
(45) Date of Patent: Oct. 11, 2022

(54) FAILSAFE MECHANISM TO IMPORT SNAPSHOTS

(71) Applicant: EMC IP Holding Company LLC, Hopkinton, MA (US)

(72) Inventors: Ashutosh Kumar Singh, Bangalore (IN); Manjesh Venkatanarayana Chikkanayakanahally, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 17/161,433

(22) Filed: Jan. 28, 2021

(65) Prior Publication Data

US 2022/0236888 A1    Jul. 28, 2022

(51) Int. Cl.
*G06F 3/06* (2006.01)
*G06F 11/14* (2006.01)

(52) U.S. Cl.
CPC ............ *G06F 3/0619* (2013.01); *G06F 3/067* (2013.01); *G06F 3/0653* (2013.01); *G06F 3/0665* (2013.01); *G06F 11/1464* (2013.01); *G06F 11/1469* (2013.01); *G06F 2201/84* (2013.01)

(58) Field of Classification Search
CPC .... G06F 3/0619; G06F 3/0653; G06F 3/0665; G06F 3/067; G06F 11/1464; G06F 11/1469
USPC .......................................................... 711/162
See application file for complete search history.

(56) References Cited

U.S. PATENT DOCUMENTS

| | | | | |
|---|---|---|---|---|
| 7,366,742 | B1* | 4/2008 | Umbehocker | G06F 11/1435 |
| 9,940,152 | B2* | 4/2018 | Barve | G06F 3/065 |
| 2016/0077926 | A1* | 3/2016 | Mutalik | G06F 16/1844 |
| | | | | 711/162 |
| 2017/0024232 | A1* | 1/2017 | Barve | G06F 11/1464 |
| 2017/0075912 | A1* | 3/2017 | Michael | G06F 11/1466 |
| 2017/0322943 | A1* | 11/2017 | Bhattacharyya | G06F 9/4856 |

OTHER PUBLICATIONS

IVSSBackupComponents:: BackupComplete method (vsbackup.h), retrieved from https://docs.microsoft.com/en-us/windows/desktop/api/VsBackup/nf-vsbackup-ivssbackupcomponents-backupcomplete, May 6, 2022.
IVssBackupComponents:: ImportSnapshots method (vsbackup.h) retrieved from https://docs.microsoft.com/en-us/windows/desktop/api/VsBackup/nf-vsbackup-ivssbackupcomponents-importsnapshots, May 6, 2022.

\* cited by examiner

*Primary Examiner* — Than Nguyen
(74) *Attorney, Agent, or Firm* — Chamberlain, Hrdlicka, White, Williams & Aughtry

(57) ABSTRACT

A method for managing a storage includes applying, by a host, a first type of snapshot service to the LU of the storage, wherein the LU is identified by a logical unit number (LUN), in response to applying the first snapshot service, making a first determination that the LU is not visible to the host, wherein the host is operationally coupled to the storage and the first snapshot service continues to be applied to the LU, in response to the first determination, discontinuing applying the first type of snapshot service to the LU, and when the first snapshot service is no longer applied to the LU, applying, by the host, a second type of snapshot service to the LU.

20 Claims, 5 Drawing Sheets

US 11,467,738 B2

FAILSAFE MECHANISM TO IMPORT SNAPSHOTS

BACKGROUND

Preservation of parts or the entirety of storage arrays is commonplace in storage systems. For a variety of reasons, however, reliable preservation of storage arrays may be problematic.

SUMMARY

In general, an aspect of the invention includes a method of managing a storage. The method includes applying, by a host, a first type of snapshot service to the LU of the storage, wherein the LU is identified by a logical unit number (LUN); in response to applying the first snapshot service, making a first determination that the LU is not visible to the host, wherein the host is operationally coupled to the storage and the first snapshot service continues to be applied to the LU; in response to the first determination, discontinuing applying the first type of snapshot service to the LU; and when the first snapshot service is no longer applied to the LUN, applying, by the host, a second type of snapshot service to the LU.

In general, in one aspect, the invention relates to a system that includes a processor ant memory that includes instructions which, when executed by the processor, performs a method. The method includes applying, by a host, a first type of snapshot service to the LU of the storage, wherein the LU is identified by a logical unit number (LUN); in response to applying the first snapshot service, making a first determination that the LU is not visible to the host, wherein the host is operationally coupled to the storage and the first snapshot service continues to be applied to the LU; in response to the first determination, discontinuing applying the first type of snapshot service to the LU; and when the first snapshot service is no longer applied to the LUN, applying, by the host, a second type of snapshot service to the LU.

In general, in one aspect, the invention relates to a non-transitory computer readable medium (CRM). The non-transitory CRM includes computer readable program code, which when executed by a computer processor, enables the computer processor to perform a method for managing a storage. The method includes applying, by a host, a first type of snapshot service to the LU of the storage, wherein the LU is identified by a logical unit number (LUN); in response to applying the first snapshot service, making a first determination that the LU is not visible to the host, wherein the host is operationally coupled to the storage and the first snapshot service continues to be applied to the LU; in response to the first determination, discontinuing applying the first type of snapshot service to the LU; and when the first snapshot service is no longer applied to the LUN, applying, by the host, a second type of snapshot service to the LU.

Other aspects of the invention will be apparent from the following description and the appended claims.

DETAILED DESCRIPTION

Figure 1:
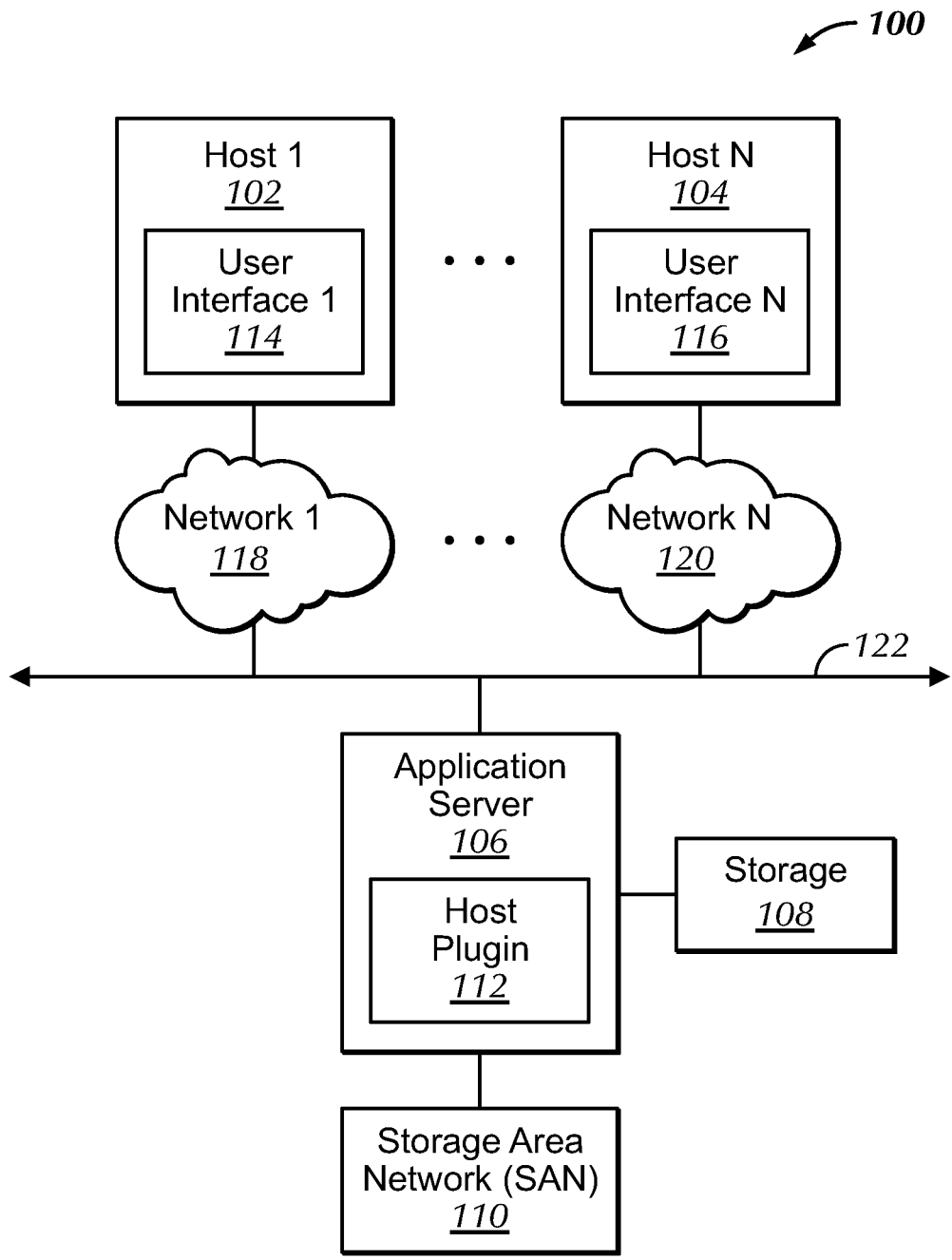
FIG. 1 shows an example system in accordance with one or more embodiments of the disclosure described herein.

Snapshots of storage arrays can shadow copy vast amounts of original data for a variety of reasons including disaster recovery, testing, copying, backup sessions, and data analytics collection. Without preserving backups of applications, for example, debugging and disaster recovery may be an impossibility. To save valuable storage space allocated for copies of original data, in some cases, pointers to the snapshots of the storage arrays, rather than the snapshots themselves, may be preserved. The Microsoft Volume Shadow Copy Service (VSS) provides such a framework. The Microsoft VSS protects and recovers data saved in storage arrays by use of pointers to snapshots. During recovery, snapshots are imported and mounted, becoming visible to a corresponding host by exposing the identification of the target storage unit of the snapshot. The visibility of the storage unit allows for recovery of the original storage array data.

As a part of the VSS framework, an application programming interface (API), e.g., the ImportSnapshots API, allows the importation of a snapshot taken on one machine to be surfaced on another machine. But the Microsoft VSS API framework imposes a timeout restriction for surfacing a storage unit to be copied, such as a logical unit (LU), on the second machine. Timeouts may arise for a variety of reasons including slow-reacting devices, large size of a snapshot to be imported, and network latency. In some cases, importing snapshots of a LU fail because the LU number (LUN), identifying the location of the LU in the storage array, is not exposed on a host of the second machine.

To address one or more of the aforementioned issues, one more embodiments of the invention relate to a failsafe method for providing a snapshot of a logical unit (LU) to an alternate machine for backups, copying, recovery, and other similar scenarios requiring a shadow copy of the LU, is presented. In some cases, the snapshot service allows for importing snapshots repeatedly to increase the chances of successfully importing the snapshots. The method may initially call a first type of snapshot service, such as the Microsoft VSS snapshot service, by Microsoft, Inc., through a corresponding application programming interface (API), and in the event the VSS snapshot service fails to properly import and mount the LU such that the LU is visible to a host and accessible for performing operations, a different type of snapshot service may be invoked, such as the Microsoft Virtual Disk Service (VDS), by Microsoft, Inc., through a corresponding API. VDS is a Microsoft Windows framework for performing query and configuration operations at the request of a user, a script, or an application, and may be invoked through the API ImportSnapshots. The service extends storage capabilities of Windows-based server operating systems by providing an API to existing volume and disk management features in Windows, and unifies volume management and hardware Redundant Array of Independent Disks (RAID) management under a single API.

A VSS API (e.g., ImportSnapshots) may be initially used to surface LUs on an alternate or target host by automatically managing the importing of snapshots of the LUs. In the event of an import failure, the method allows automatic importing of snapshots through repeated attempts, via a VDS API, until the system is successful in importing the LUs thereby allowing the user to mount and recover the desired data from the LUs.

More specifically, in accordance with an embodiment of the invention, a workflow may initially attempt to use the VSS API for mounting, or making a LU accessible to a host, therefore, importing the LU. The VSS API is initially implemented because it offers a faster approach to mounting LUs relative to the VDS API. If successful, the workflow completes. Otherwise, if the mounting and importing fail, the LU is scanned on the original host, which halts executing the VSS API and starts executing the VSS API in order to identify a corresponding logical unit number (LUN) of the LU using the VDS API. A match between the LU, which is to be mounted, and the LU that is fetched from the scan operation is sought. In response to finding no match, the LU scan is retried at predetermined time intervals (e.g., 30-seconds intervals), and at each interval, for a predetermined time period (e.g., 30 minutes), using the VDS API, until the LU is surfaced. This is repeated for all desired LUs. When all the desired LUs are made available or exposed, the VDS API is used to mount the LUs with success and the LUs are accessible for performing operations like read and write operations. After the mounted LUs are no longer needed, the LUs may be unmounted.

A typical workflow for importing a transportable shadow copy of a LU on an alternate or second machine using the Microsoft VSS ImportSnapshots API mounts a LU, provided by a storage array for copying, as a volume on a first machine, e.g., systemOne, drive F:. A requester agent executing on systemOne instantiates the backup and creates a transportable shadow copy of the LU. The requester agent then saves and transfers a Backup Components Document and the writer's Writer Metadata Documents to an alternate machine, i.e., systemTwo. A requester agent on systemTwo calls the Microsoft ImportSnapshots API to enable access to the shadow copy that was created by the requester agent on systemOne and proceeds with the backup of the shadow copied data as if it were backing up a shadow copy that it created. The requester on systemTwo signals the requester on systemOne that it has finished with the backup of the transportable shadow copy. After the requester on systemOne has received notification that the requester on systemTwo has finished the backup of the transportable shadow copy, it notifies the writers on its system by generating a BackupComplete event.

Various embodiments of the disclosure are described below.

FIG. 1 illustrates an exemplary storage management system (100), according to one or more embodiments of the disclosure. As shown in FIG. 1, the storage management system (100) includes one or more hosts, host (102, 104), an application server (106), storage (108), a storage area network (SAN) (110), a network 1 (118), a network 2 (120), and a bus (122). The application server (106) includes a host plugin (112). The hosts (102, 104) are operationally coupled to the application server (106) through the network 1 (118), network 2 (120), respectively, and bus (122). In an embodiment of the disclosure, the bus (122) may adhere to one or numerous protocols, such as, without limitation, the peripheral component interconnect express (PCI-e) or the non-volatile memory express (NVMe) protocols for communicatively connecting devices coupled onto the bus (122) together.

With continued reference to FIG. 1, the application server (106) is, in turn, operationally coupled to the storage (108) and the SAN (110). In an embodiment of the disclosure, the application server (106) may be coupled to the storage (108) and the SAN (110) through corresponding local busses. In one or more embodiments of the invention, each of the aforementioned components may communicate using any combination of wired and/or wireless communication technology. Each of the aforementioned components is described below.

Each of the hosts (102, 104) includes a corresponding user interface (UI) for receiving input from a user (not shown), graphically displaying the user input, and taking an action based on the user input.

In an embodiment of the disclosure, each of the hosts (102, 104) may be implemented using one or more computing devices (e.g., see FIG. 5) functionally equipped to receive input from a user and based on the input, direct the system (100) to request a snapshot service through user interface (UI) (114), (116), respectively. Further details of the hosts (102, 104) are presented below with reference to FIG. 5.

In one embodiment of the disclosure, the hosts (102, 104) are each a physical or virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the hosts (102, 104) includes executable instructions (stored in a non-transitory computer readable medium (not shown), which when executed, enable the hosts (102, 104) to perform one or more methods described below (see e.g., FIGS. 3, 4).

In one embodiment of the disclosure, the network (118) may be the medium through which the host (102) is operatively connected to the application server 106 through the bus (122). Similarly, the network (120) may be the medium through which the host (104) is operatively connected to the application server 106 through the bus (122). In one embodiment of the invention, each of the networks (118, 120) may include other network systems (not shown) that facilitate communication between the aforementioned components. As such, in one embodiment of the disclosure, each of the networks may include any combination of local and/or wide area (e.g., Internet) network segments that may be wire-based and/or wireless and that may use any combination of wired and/or wireless communication protocols. In an embodiment of the invention, the networks (118, 120) may be a part of the same network.

As earlier noted, the application server (106) includes the host plugin (112). In an embodiment of the invention, the host plugin (112) implements a VSS and a VDD API. VDS and VSS are each a Microsoft Windows storage configuration manager service for Windows. For example, a Vds.exe file opens the VDS API that performs query and configuration operations at the request of users (e.g., user of host 1 (102) or host 2 (104)), scripts, and applications. The VDS API (e.g., 112) can manage volumes and perform other disk management functionality of the storage arrays of the storage (108) and the storage devices of SAN (11) in Windows. VDS can further unify volume management and hardware Redundant Array of Independent Disks (RAID) management under a single API (e.g., 112). VDS can manage a wide range of storage configurations from single desktops (e.g., hosts (102, 104)) to external storage devices (e.g., 108, 110).

In an embodiment of the disclosure, the application server (106), which is a host itself, may be implemented using one or more computing devices functionally equipped to synchronize the API functionality of the host plugin (112) via a unified query language (e.g., Graph Query Language) under a single endpoint. The application server (106) allows access to the SAN (110) and the storage devices of the SAN (110) to form the host layer of the SAN. For example, the application server (106) may have host adapters (not shown), which are cards that attach to slots on the application server (106) motherboard (e.g., PCI-e slots) and execute with a corresponding firmware and device driver. Through the host adapters, the operating system of the application server (106) can communicate with the storage devices in the SAN (110).

In one embodiment of the disclosure, the application server (106) is a physical or virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory. The Virtual Disk Service (VDS) manages a wide range of storage configurations, from single-disk desktops to external storage arrays. The service exposes an application programming interface (API).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the application server (106) includes executable instructions (stored in a non-transitory computer readable medium (not shown), which when executed, enable the application server (106) to perform one or more methods described below (see e.g., FIGS. 3, 4).

In an embodiment of the disclosure, the storage (108) may be made of storage arrays functionally equipped to store logical units (LUs). The storage (108) may be a RAID device, made of non-persistent storage (606) (e.g., volatile memory, such as random access memory (RAM), cache memory), persistent storage (608) (e.g., a hard disk, an optical drive such as a compact disk (CD) drive or digital versatile disk (DVD) drive, a flash memory, etc.), or a combination of non-persistent and persistent storage. Many different types of storage types exist, and the aforementioned storage (108) may take other forms.

In an embodiment of the disclosure, the SAN (110) may be implemented using one or more computing devices functionally equipped to provide a high-speed network for providing block-level network access to storage. SAN (110) is a dedicated network for data storage. In addition to storing data, SAN (110) may allow for the automatic backup of data (e.g., data stored in storage (108)), and the monitoring of the data storage as well as the backup process. In an embodiment of the invention, SAN (110) provides a high-speed network for block-level network access to the storage (108) through the application server (106), storage within or coupled to SAN (110), or a combination thereof. SAN (110) may include one or more hosts, switches, storage elements, and storage devices that are interconnected using a variety of technologies, topologies, and protocols. SAN (110) may span multiple networked sites. The network devices of SAN (110) can move data within the SAN (110), or between hosts (102, 104) and a target device, such as the port of a storage device (e.g., 108) or a storage device within or coupled to the SAN (110). The SAN (110) switches connect the servers within or coupled to SAN (110) or application server (106) with the storage devices and are typically non-blocking allowing transmission of data across all attached wires at the same time.

In one embodiment of the disclosure, the SAN (110) is a physical or virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

Figure 2:
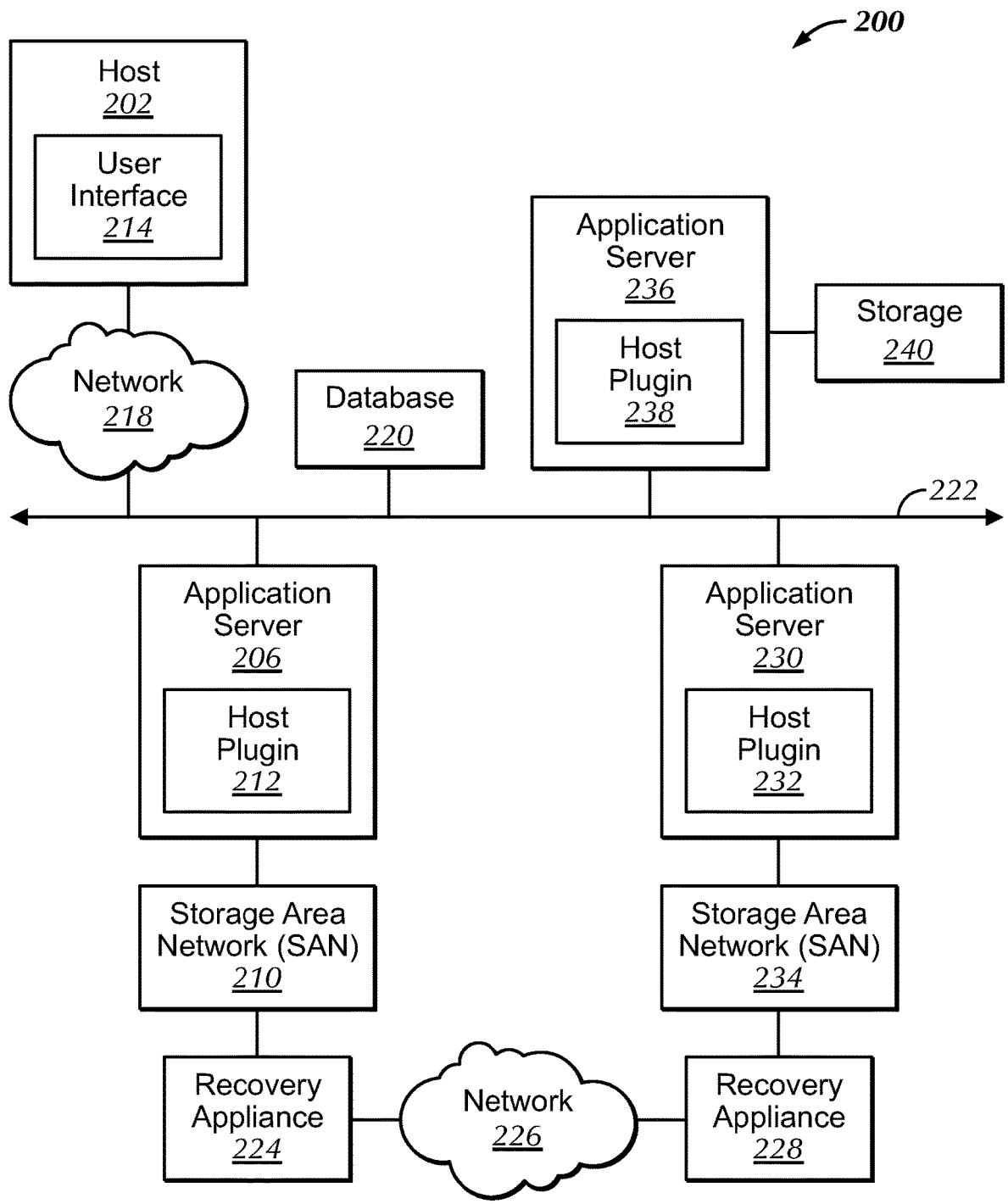
FIG. 2 shows another example system in accordance with one or more embodiments of the disclosure described herein.

FIG. 2 illustrates an exemplary storage management system (200), according to one or more embodiments of the disclosure. As shown in FIG. 2, the storage management system (200) includes a host (202), an application server (206), storage (240), a storage area network (SAN) (210), a network (818), database (220), a network (226), a recovery appliance (224), a recovery appliance (228), an application server (230), a SAN (234), an application server (236), and a bus (222). The application server (206) includes a host plugin (212), the application server (230) includes a host plugin (232), and the application server (236) includes a host plugin (238). The host (202) is operationally coupled to the application server (206) through the network (218). The host (202), the database (220), and the application servers (230) and (236) are operationally coupled together through the bus (222).

In an embodiment of the invention, the components of FIG. 2 correspond to like components of FIG. 1. For example, the bus (222) of FIG. 2 corresponds to bus (122) of FIG. 1; each of the application servers (206), (230), and (236) of FIG. 2 corresponds to the application server (106) of FIG. 1; each of the SANs (210), (234), and (238) of FIG. 2 corresponds to the SAN (110) of FIG. 1; the network (218) of FIG. 2 corresponds to the network (118) of FIG. 1; and the storage (240) of FIG. 2 corresponds to the storage (108) of FIG. 1. For further details of the bus (222), application servers (206), (230), and (236), SANs (210), (234), and (238), and the network (218) of FIG. 2, the reader is directed to earlier discussions of corresponding like components of FIG. 1.

With continued reference to FIG. 2, the application server (236) is, in turn, operationally coupled to the storage (240) through a local bus. The application server (206) is operationally coupled to the SAN (210) through a local bus and similarly, the SAN (210) is operationally coupled to the recovery appliance (224) through a local bus. The application server (230) is operationally coupled to the recovery appliance (228) through a local and further coupled to the SAN (234) through a local bus. Each of the recovery appliances (224) and (228) is coupled to the network (226) through a corresponding local bus. In an embodiment of the disclosure, the application server (106) may be coupled to the storage (108) and the SAN (110) through corresponding local busses. In one or more embodiments of the invention, each of the aforementioned components may communicate using any combination of wired and/or wireless communication technology. Each of the aforementioned components is described below.

The host (202) includes a corresponding user interface (UI) (214) analogously to host (102) or host (104) of FIG. 2.

In an embodiment of the disclosure, the database (220) may be implemented using one or more computing devices (e.g., see FIG. 5) functionally equipped to manage application data at the data presentation layer. For example, the database (220) may temporarily store and manage data from an API executing as the host plugin (212) on the application server (206), the host plugin (232) on the application server (230), and the host plugin (238) on the application server (236). Further details of the hosts (102, 104) are presented below with reference to FIG. 5.

In one embodiment of the disclosure, the database (220) is a physical or a virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the database (220) includes executable instructions (stored in a non-transitory computer readable medium (not shown), which when executed, enable the database (220) to perform one or more methods described below (see e.g., FIGS. 3, 4). In an embodiment of the invention, the database (220) may be a relational type of database but the database (220) need not be a relational database.

In an embodiment of the disclosure, each of the recovery appliances (224) and (228) may be implemented using one or more computing devices (e.g., see FIG. 5) functionally equipped to recover data from one or more LUs of a SAN (e.g., 210, 234) under the direction of a host plugin (e.g., 212, 232).

In one embodiment of the invention, the network (226) may be the medium through which the recovery appliances (224) and (228) are operatively connected to each other. As such, in one embodiment of the invention, the network (226) may include any combination of local and/or wide area (e.g., Internet) network segments that may be wire-based and/or wireless and that may use any combination of wired and/or wireless communication protocols.

In a specific scenario, through the UI (214), a user may initiate a snapshot service to implement data recovery using the recovery appliances (224) and (228). In such a scenario, a workflow, in accordance with an embodiment of the invention, may initially attempt to use the VSS API via execution of the host plugin (212) on application server (206) for mounting, or making a LU of the SAN (210) accessible to the recovery appliance (224) to import the LU to the recovery appliance (224) to recover the LU data. If successful, the workflow completes. Otherwise, if the mounting and importing fail, the LU of the recovery appliance (224) is scanned by the application server (206), which halts executing the VSS API and starts executing the VSS API as the host plugin (212) in order to identify a corresponding logical unit number (LUN) of the LU. When the application server (206) finds a match between the LU of the SAN (210), which is to be mounted, and the LU that is fetched from the scan operation, the process ends and the LU is mounted at the recovery appliance (224). But if the application server (206) fails to find a match between the LU of the SAN (210), the LU scan is retried at predetermined time intervals (e.g., 30-seconds intervals), and at each interval, for a predetermined time period (e.g., 30 minutes), using the VDS API executing as the host plugin (212) on the application server (206), until the LU is surfaced. This is repeated for all LUs with data that is desired to be recovered. When all the desired LUs are made available or exposed, the VDS API is used to mount the LUs onto the recovery appliance (224) with success. After the mounted LUs are no longer needed, the LUs may be unmounted from the recovery appliance (224). The recovery appliance (228) and the application server (230) operate in a similar fashion. Each of the recovery appliances (224) and (228) may share mounted LUs through the network (226). Without limitation, examples of each of the recovery appliances (224) and (228) are a PowerProtect Data Manager (PPDM) and Avamar, a hardware and software data backup product manufactured by Dell EMC.

Figure 3:
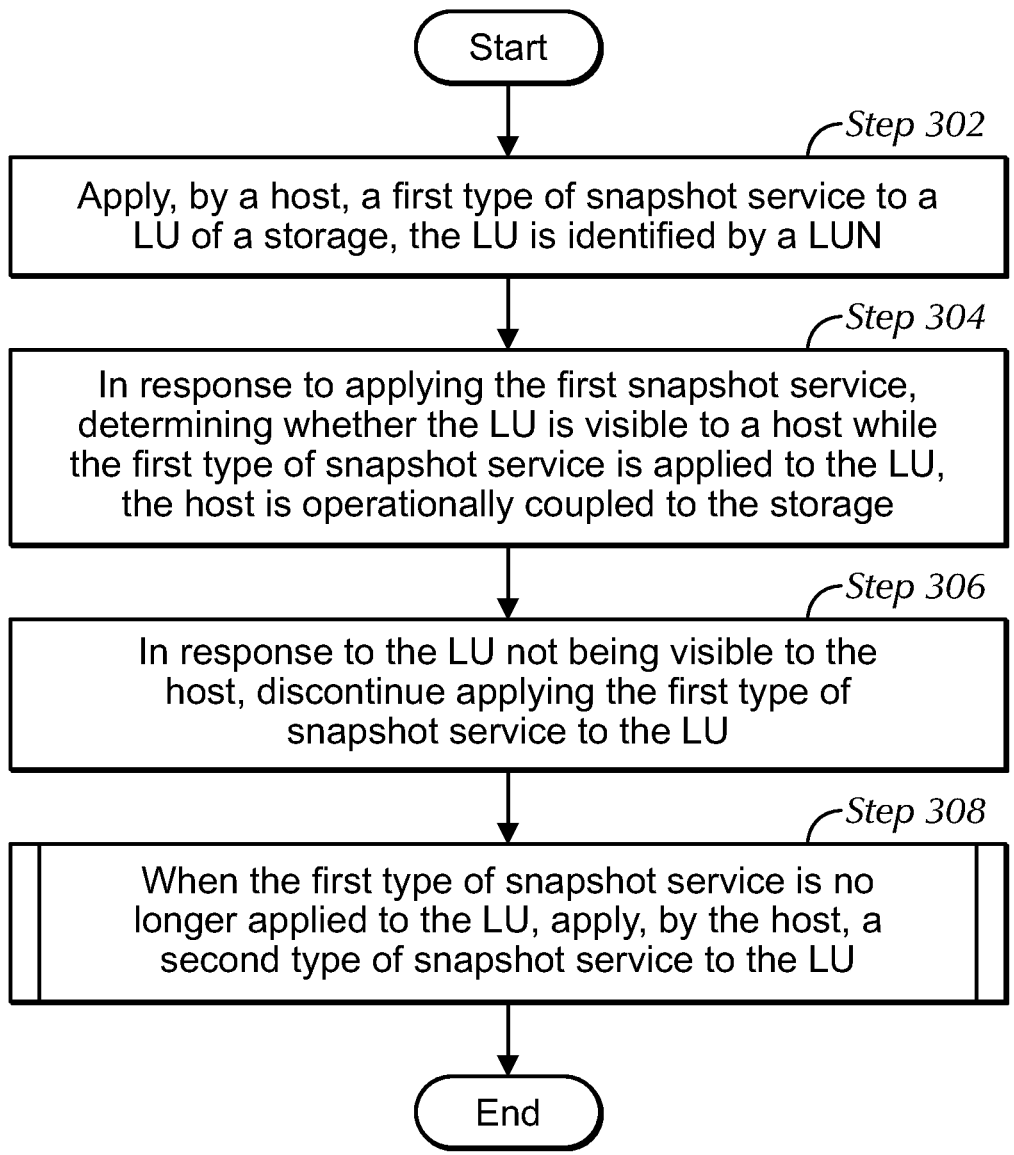
FIG. 3 shows a flowchart describing a method for managing a storage in accordance with one or more embodiments of the disclosure disclosed herein.

FIG. 3 shows a flowchart describing a method for managing a storage in accordance with one or more embodiments described herein. The method of FIG. 3 may be performed by, for example, by the application server (106) when executing the host plugin (112), of FIG. 1, the application server (206) when executing the host plugin (212), the application server (230) when executing the host plugin (232), or the application server (236) when executing the host plugin (238), of FIG. 2. Other components not illustrated in FIG. 1 or FIG. 2 may perform or assist in performing the method of FIG. 3 without departing from the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 302, a first type of snapshot service is applied, by a host (e.g., 106, FIG. 1; 206, FIG. 2; 230, FIG. 2; 236, FIG. 2), to a LU of a storage (e.g., 106, FIG. 1; 240, FIG. 2). The LU is identified by a LUN. For example, the Microsoft VSS snapshot service may be the first type of snapshot service applied to the LU of the storage. The host may initially apply the Microsoft VSS snapshot service due to its fast service.

At step 304, in response to applying the first snapshot service, while the first snapshot service continues to be applied to the LU, the host makes a determination that the LU is not visible to the host. That is, importing snapshots of the LU to a target volume or a target host fails. Importing snapshots of the LU may fail because the LU number (LUN) of the LU, identifying the location of the LU in the storage, is not exposed on the target volume or target host. Therefore, the LU remains inaccessible for performing operations.

At step 306, in response to the determination at step 304, the host discontinues applying the first type of snapshot service to the LU. The host discontinues applying the first type of snapshot service to the LU because the LU is not visible to the host, accordingly, no volume or drive may be mounted.

At step 310, when the first snapshot service is no longer applied to the LU by the host, the host applies, a second type of snapshot service to the LU. The second type of snapshot service is different than the first type of snapshot service. For example, the second type of snapshot service may be the Microsoft VDS service.

Figure 4:
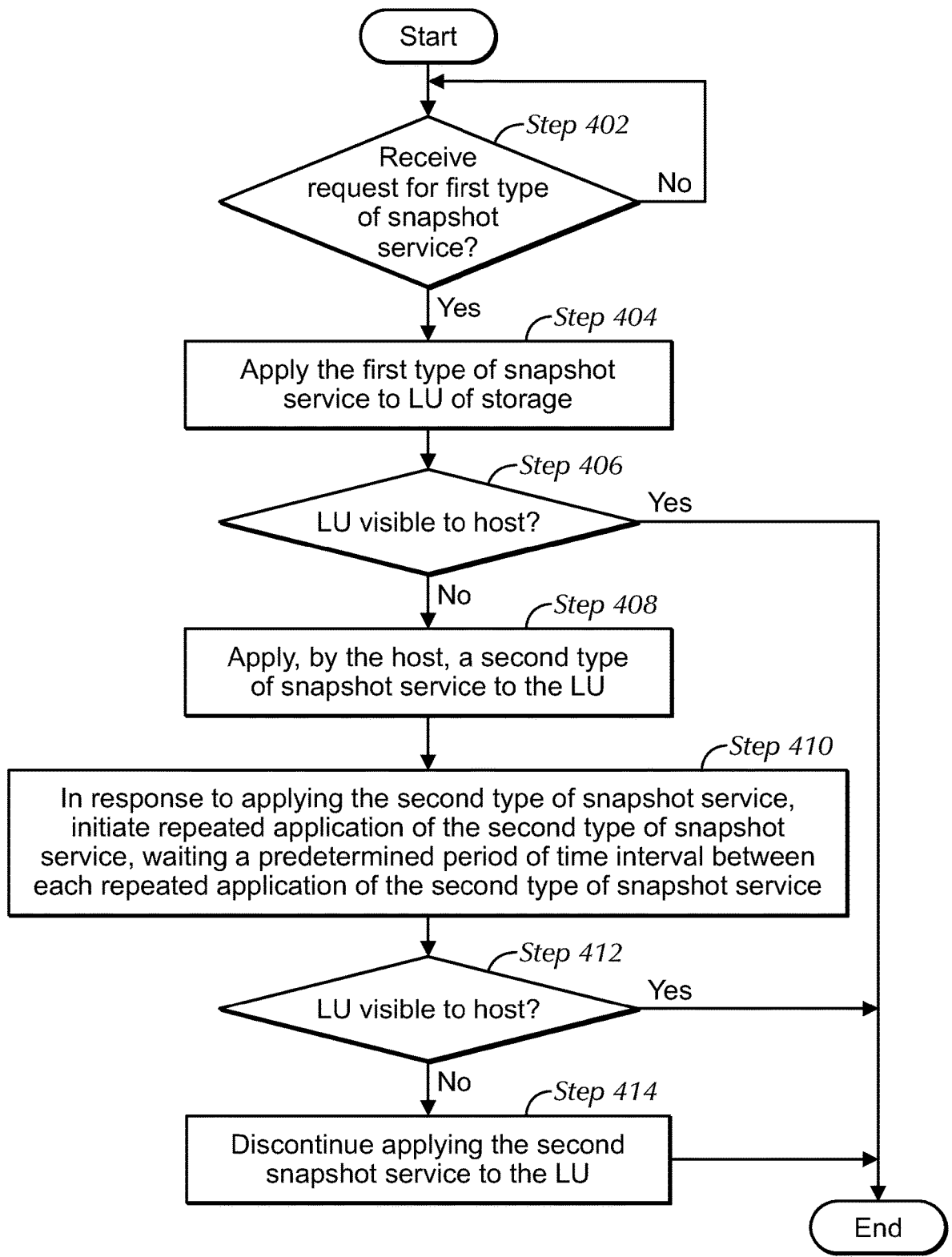
FIG. 4 shows a flowchart describing another method for managing a storage in accordance with one or more embodiments of the disclosure disclosed herein.

FIG. 4 shows a flowchart describing a method for managing a storage in accordance with one or more embodiments described herein. The method of FIG. 4 may be performed by, for example, by the application server (106) when executing the host plugin (112), of FIG. 1, the application server (206) when executing the host plugin (212), the application server (230) when executing the host plugin (232), or the application server (236) when executing the host plugin (238), of FIG. 2. Other components not illustrated in FIG. 1 or FIG. 2 may perform or assist in performing the method of FIG. 4 without departing from the disclosure.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At step 402, a host (e.g., 106, FIG. 1; 206, FIG. 2; 230, FIG. 2; 236, FIG. 2) waits to receive a request for a first type of snapshot service. The host may receive such a request from a UI (e.g., 114, FIG. 1) of a different host (e.g., 102, 104, FIG. 1) coupled to the host.

In response to receiving the request at step 402, at step 404, the host applies the first type of snapshot service to the LU of the storage. For example, the Microsoft VSS snapshot service may be the first type of snapshot service applied to the LU of the storage. The host may initially apply the VSS snapshot service due to its fast service.

At step 406, while the first type of snapshot service is applied to the LU, the host makes a determination as to whether the LU is visible to the host. Step 406 is similar to step 304 of FIG. 3. In response to the host determining that the LU is visible to the host, the process ends and the LU is imported and mounted. In response to the host determining that the LU is not visible to the host, the host proceeds to step 408.

At step 408, the host halts applying the first type of snapshot service to the LU and applies a second type of snapshot service to the LU. The second type of snapshot service is different than the first type of snapshot service and may be slower than the first type of snapshot service. Step 408 is similar to step 308 of FIG. 3.

At step 410, while applying the second type of snapshot service to the LU, the host initiates repeated application of the second type of snapshot service. The host may wait a time interval between the repeated second type of snapshot service before applying the next second type of snapshot service. For example, and without limitation, the host may wait seconds or minutes before applying the next second type of snapshot service. The second type of snapshot service may be a VDS snapshot service.

At step 412, while the second type of snapshot service is applied to the LU, the host makes another determination as to whether the LU is visible to the host at each repeat of application of the second type of snapshot service to the LU. In response to the host determining that the LU is visible to the host at one of the repeats of the application of the second type of snapshot service to the LU, the process ends and the LU is imported and mounted. In response to the host determining that the LU is not visible to the host, the host repeats applying the second type of snapshot service to the LU. The host may continue applying the second type of snapshot service to the LU if the LU remains invisible for a predetermined number of times. For example, the host may repeat applying the second type of snapshot service to the LU 10 times. If the LU continues to remain invisible after repeating applying the second type of snapshot service to the LU a predetermined number of times, the process proceeds to step 414.

At step 414, the host discontinues or halts applying the second snapshot service to the LU and the LU does not mount.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

Figure 5:
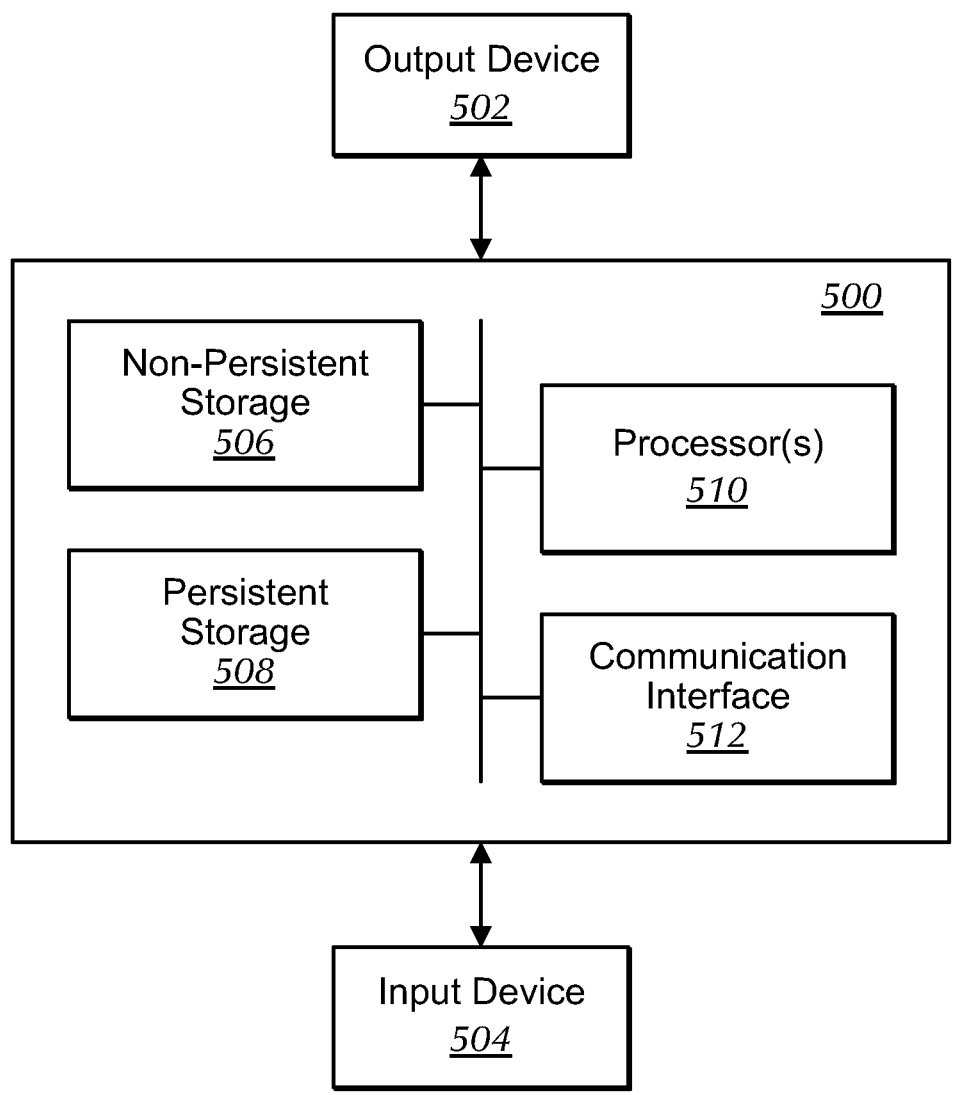
FIG. 5 shows an example host in accordance with one or more embodiments described herein.

As discussed above, embodiments of the disclosure may be implemented using computing devices. FIG. 5 shows a diagram of a computing device in accordance with one or more embodiments of the disclosure.

The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of managing a storage, the method comprising:
    applying, by a host, a first type of snapshot service to the LU of the storage, wherein the LU is identified by a logical unit number (LUN);
    in response to applying the first snapshot service, making a first determination that the LU is not visible to the host, wherein the host is operationally coupled to the storage and the first snapshot service continues to be applied to the LU;
    in response to the first determination, discontinuing applying the first type of snapshot service to the LU; and
    when the first snapshot service is no longer applied to the LU, applying, by the host, a second type of snapshot service to the LU.

2. The method of claim 1, further comprising:
    in response to applying the second type of snapshot service to the LUN:

making a second determination that the LU is not visible to the host; and in response to the second determination, initiating a repeated application of the second type of snapshot service to the LU.

3. The method of claim 2, further comprising:
after initiating the repeated application of the second type of snapshot service to the LU:
making a third determination about whether the LU is visible to the host.

4. The method of claim 3, halting the second type of snapshot service when the third determination is that the LU is visible to the host.

5. The method of claim 1, further comprising:
in response to the first determination, waiting a predetermined period of time prior to discontinuing applying the first type of snapshot service to the LU.

6. The method of claim 1, wherein:
the first type of snapshot service is a Volume Shadow Copy Service (VSS); and
the second type of snapshot service is a Virtual Disk Service (VDS).

7. The method of claim 1, wherein discontinuing applying the first type of snapshot service to the LU because the LU number (LUN) of the LU, identifying a location of the LU in the storage, is not exposed on the host.

8. A system, comprising:
a processor; and
memory comprising instructions which, when executed by the processor, perform a method, the method comprising:
applying, by a host, a first type of snapshot service to the LU of the storage, wherein the LU is identified by a logical unit number (LUN);
in response to applying the first snapshot service, making a first determination that the LU is not visible to the host, wherein the host is operationally coupled to the storage and the first snapshot service continues to be applied to the LU;
in response to the first determination, discontinuing applying the first type of snapshot service to the LU; and
when the first snapshot service is no longer applied to the LU, applying, by the host, a second type of snapshot service to the LU.

9. The system of claim 8, further comprising:
in response to applying the second type of snapshot service to the LUN:
making a second determination that the LU is not visible to the host; and
in response to the second determination, initiating a repeated application of the second type of snapshot service to the LU.

10. The system of claim 9, further comprising:
after initiating the repeated application of the second type of snapshot service to the LU:
making a third determination about whether the LU is visible to the host.

11. The system of claim 10, halting the second type of snapshot service when the third determination is that the LU is visible to the host.

12. The system of claim 8, further comprising:
in response to the first determination, waiting a predetermined period of time prior to discontinuing applying the first type of snapshot service to the LU.

13. The system of claim 8, wherein the first type of snapshot service is a Volume Shadow Copy Service (VSS).

14. The system of claim 13, wherein second type of snapshot service is a Virtual Disk Service (VDS).

15. The system of claim 8, wherein discontinuing applying the first type of snapshot service to the LU because the LU number (LUN) of the LU, identifying a location of the LU in the storage, is not exposed on the host.

16. A non-transitory computer readable medium comprising computer readable program code, which when executed by a computer processor enables the computer processor to perform a method for managing a storage, the method comprising:
performing, by the session initiator and in parallel with an iterative process, a non-iterative process, comprising:
applying, by a host, a first type of snapshot service to the LU of the storage, wherein the LU is identified by a logical unit number (LUN);
in response to applying the first snapshot service, making a first determination that the LU is not visible to the host, wherein the host is operationally coupled to the storage and the first snapshot service continues to be applied to the LU;
in response to the first determination, discontinuing applying the first type of snapshot service to the LU; and
when the first snapshot service is no longer applied to the LU, applying, by the host, a second type of snapshot service to the LU.

17. The non-transitory computer readable medium of claim 16, the method further comprising:
in response to applying the second type of snapshot service to the LUN:
making a second determination that the LU is not visible to the host; and
in response to the second determination, initiating a repeated application of the second type of snapshot service to the LU.

18. The non-transitory computer readable medium of claim 17, the method further comprising:
after initiating the repeated application of the second type of snapshot service to the LU:
making a third determination about whether the LU is visible to the host.

19. The non-transitory computer readable medium of claim 18, the method further comprising:
halting the second type of snapshot service when the third determination is that the LU is visible to the host.

20. The non-transitory computer readable medium of claim 16, the method further comprising:
in response to the first determination, waiting a predetermined period of time prior to discontinuing applying the first type of snapshot service to the LU.

* * * * *